Oct. 10, 1933.  C. H. WILLIS  1,929,730
ELECTRIC VALVE CONVERTING APPARATUS
Filed Dec. 22, 1931
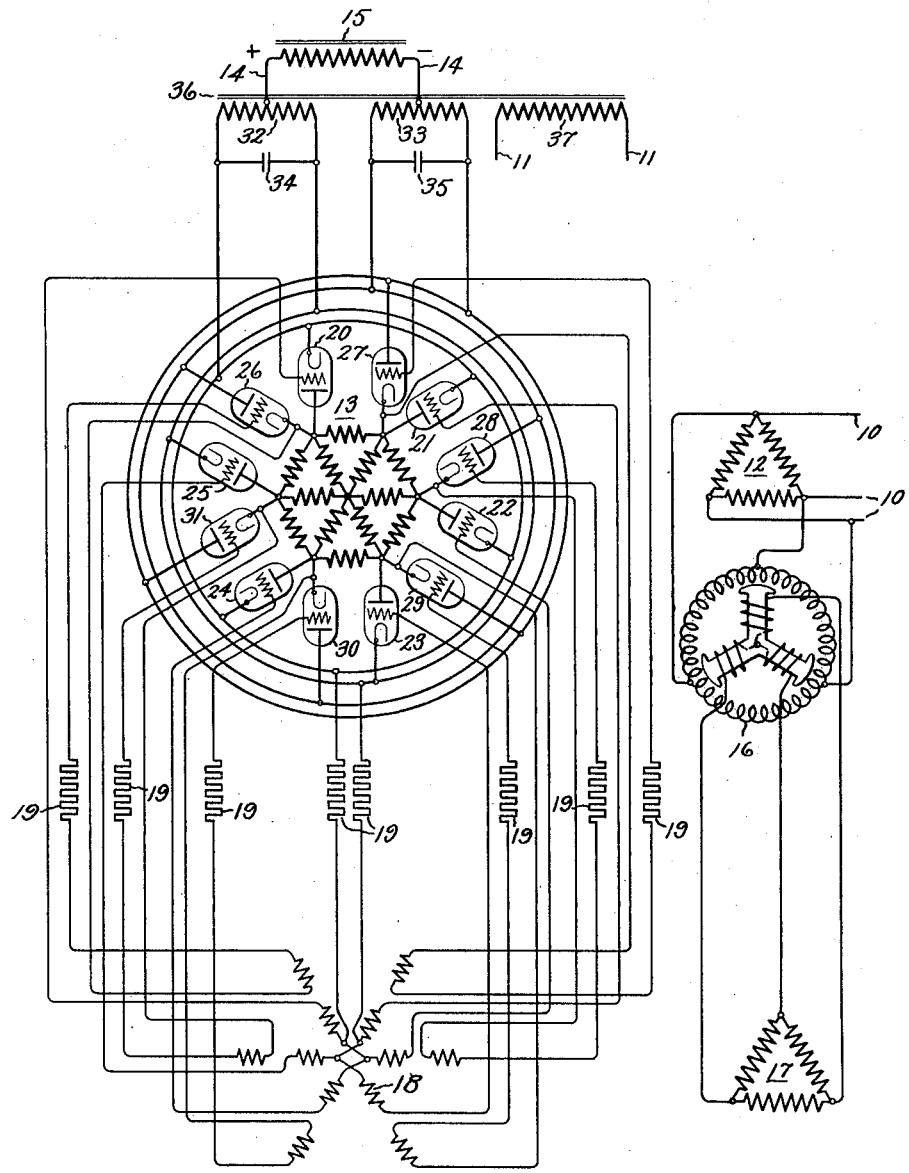
Inventor:
Clodius H. Willis;
by Charles E. Mullan
His Attorney.

Patented Oct. 10, 1933

1,929,730

UNITED STATES PATENT OFFICE 1,929,730

ELECTRIC VALVE CONVERTING APPARATUS

Clodius H. Willis, Princeton, N. J., assignor to General Electric Company, a corporation of New York Application December 22, 1931
Serial No. 582,590

9 Claims. (Cl. 172—281)

My invention relates to electric valve converting apparatus and more particularly to such apparatus adapted to transmit energy between alternating current circuits of different frequencies.

Heretofore there have been devised numerous apparatus including electric valves for transmitting energy between alternating current circuits of different frequencies. Such apparatus has usually comprised a plurality of electric valves for rectifying the alternating current supply and a plurality of other electric valves for inverting the rectified current to an alternating current of the desired frequency, in certain instances the same electric valves effecting both the rectifying and inverting operations. The use of vapor electric discharge valves in valve converting apparatus of this type has been found particularly advantageous because of the relatively large amounts of power which may be handled at ordinary operating voltages. However, the problems arising in the commutation of current between valves of the vapor electric discharge type have placed certain limitations with respect to frequency, power factor, etc., of valve converting apparatus in which they have been employed.

In my copending applications, Serial No. 566,368, Serial No. 566,372 and Serial No. 566,367, all filed October 1, 1931, and all assigned to the same assignee as the present application, there are disclosed certain electric valve converting apparatus, preferably utilizing valves of the vapor electric discharge type, which are suitable for transmitting energy between direct and alternating current circuits under any desired power factor conditions on the alternating current circuit. In the arrangements disclosed in those applications the commutation of current between the several electric valves is effected by an independent commutating winding across which there is produced an alternating potential of the proper frequency and phase relation to transfer the current between adjacent valves against the instantaneous electromotive force of the alternating current circuit interconnecting the valves. In certain of the arrangements, this commutating potential is provided by means of a capacitor interposed in series circuit relationship with the connections between the valves and the direct current circuit, this capacitor being so connected that its terminal potential is available to commutate the current between the valves. Although these features are described in the present application, they form no part of the present invention but are broadly claimed in my aforesaid copending applications.

My present invention relates to an electric valve converting apparatus employing the same principle of commutation and adapted to transmit energy from an alternating current supply circuit to an alternating current load circuit of a higher frequency.

It is an object of my invention, therefore, to provide an improved electric power converting apparatus for transmitting energy between alternating current circuits of different frequencies which will overcome the above mentioned disadvantages of the arrangements of the prior art and which will supply an alternating current load of any desired power factor.

It is another object of my invention to provide an improved electric valve converting apparatus for converting alternating current of a given frequency into alternating current having a frequency which is an integral multiple of that of the supply current and for supplying energy at any desired power factor to the alternating current load circuit.

It is a further object of my invention to provide an improved electric valve converting apparatus for transmitting energy between alternatng current circuits of different frequences in which the alternating supply current is first transmitted to an intermediate direct current circuit, in which there is provided an independent commutating winding and a serially connected impedance element in the connections between the several electric valves and the direct current circuit, and in which the alternating current of higher frequency is obtained by loading the commutating apparatus.

In accordance with one embodiment of my invention, a polyphase alternating current supply circuit is interconnected with an intermediate direct current circuit through a plurality of electric valves. In order to commutate the current between the several electric valves under any desired power factor conditions, there are interposed in the connections between said electric valves and the direct current circuit a commutating winding and a serially connected impedance element. This impedance element may be connected in series circuit relationship with the connections between the valves and the direct current circuit, as illustrated in the present embodiment, or with any other portion of the apparatus carrying the load current. The grid potentials of the several electric valves are preferably displaced in phase relative to their respective anode potentials in order to produce a wattless component of circulating current through the apparatus. With such an arrangement, an alternating current having a frequency which is a multiple of that of the supply circuit may be obtained by loading the commutating apparatus.

For a better understanding of my invention, together with other and further objects thereof, reference is had to the following description taken in connection with the accompanying drawing and its scope will be pointed out in the appended claims. The single figure of the accompanying drawing illustrates an embodiment of my invention for transmitting energy from a three phase alternating current supply circuit to a single phase alternating current load circuit adapted to operate at three times the frequency of the supply circuit.

Referring to the drawing there is illustrated an arrangement for transmitting energy from a three phase alternating current circuit 10 to a single phase alternating current circuit 11 adapted to operate at three times the frequency of the circuit 10. This apparatus comprises a transformer having a three phase primary network 12 connected to the alternating current circuit 10 and a six phase secondary network 13, the several terminals of which are connected to the positive side of an intermediate direct current circuit 14 through electric valves 20–25, inc., and to the negative side of the direct current circuit 14 through electric valves 26–31 inc., the connections being similar to a six phase full wave rectifier. Obviously, if half wave operation is satisfactory, only one set of electric valves need be used, in which case the other direct current terminal is connected to the electrical neutral of the network 13. The direct current circuit 14 may be connected to any suitable load circuit if desired, but is preferably short circuited through a reactor 15. Electric valves 20–31 inc., are each provided with an anode, a cathode and a control grid and may be of any of the several types well known in the art, although I prefer to use valves of the vapor electric discharge type. In order to control the power factor at which current is supplied by the alternating current circuit 10, the grids of the several electric valves 20–31 inc. are energized therefrom through any suitable connection, such for example as a rotary phase shifting transformer 16, and a grid transformer comprising a three phase primary network 17 energized from the phase shifting transformer 16 and a six phase star-connected secondary network 18 comprising separate insulated phase windings for exciting the several valves or groups of valves having independent cathode potentials. In case valves of the vapor electric discharge type are utilized the grid transformer including the windings 17 and 18 should be self-saturating or separate saturating transformers should be interposed between this transformer and the grids of the several electric valves, or some other means of providing a grid excitation of peaked wave form should be provided since each of the valves should be excited for a period somewhat less than 60 electrical degrees. However, this feature of exciting the grids with a potential of peaked wave form forms no part of my present invention, but is disclosed and broadly claimed in the copending application of B. D. Bedford, Serial No. 485,335, filed September 29, 1930, and assigned to the same assignee as the present application. Current limiting resistors 19 are preferably included in several grid circuits.

Interposed in the connections between the several electric valves 20–31 inc. and the direct current circuit 14 are transformer windings 32 and 33 each provided with an electrical midpoint connected to the direct current circuit 14, and with a pair of end terminals, each of said end terminals being connected to similarly disposed electric valves connected to alternate terminals of the network 13. Across the windings 32 and 33 are connected capacitors 34 and 35 respectively. The windings 32 and 33 comprise the primary windings of a transformer 36 provided with a secondary winding 37 connected to the alternating current load circuit 11. The connections are such that the current flows through the windings 32 and 33 in the same direction at any particular instant, so that neglecting the winding 37 and the magnetizing current of the transformer, the windings 32 and 33 comprise two series autotransformers the secondary circuits of which include the capacitors 34 and 35 respectively. The effect of adding the winding 37 is equivalent to connecting a load across one of the capacitors 34 or 35.

In explaining the operation of the above described apparatus, it will be assumed that a pair of oppositely connected electric valves associated with diametrical terminals of the network 13 are initially made conductive, for example, electric valves 20 and 29. Current will then flow from the network 13 through electric valve 20, the left hand portion of inductive winding 32, reactor 15, the right hand portion of transformer winding 33, electric valve 29 to the dimetrically opposite terminal of the network 13. During this interval it will be noted that the magnetomotive force of the windings 32 and 33 are in the same direction and are necessarily equal since they are produced by the same current. Neglecting the magnetizing current required to excite the transformer 36, it is seen that any load current which flows through one half of these windings must be balanced by an equal and opposite current flowing in the other half and the only path in which these balancing currents can flow is through capacitors 34 and 35, respectively. The result is that during the interval in which one pair of electric valves is conducting, capacitors 34 and 35 become charged to a potential proportionate to the load current flowing; that is, the capacitors are effectively in series with the load current of the apparatus. During the next successive interval when the next successive pair of electric valves is conductive, these capacitors become charged to an equal potential of opposite polarity. Since capacitors 34 and 35 are connected between adjacent similarly disposed electric valves, their potentials are effective to commutate the current between the successive valves with which they cooperate. If the grid potentials of the several electric valves are in phase with their respective anode potentials, it will be seen that the maximum voltage will be impressed upon the direct current circuit 14 and that this voltage would be short circuited through the reactor 15. However, if the grid potentials of the several valves be displaced substantially 90 degrees with respect to their anode potentials, it is well understood by those skilled in the art that the average voltage impressed upon the direct current circuit 14 approaches zero and this value may be made sufficiently low so that it is just sufficient to produce a circulating current through the apparatus. In the arrangements of the prior art it has been possible only to control the average voltage of the direct current circuit by retarding the phase of the grid potentials of the electric valves, but with the above described arrangement, the grid potentials may be advanced in phase, since the potential across capacitors 34 and 35 is available at the instant of commutation to transfer the current between adjacent valves even in opposition to the electromotive force of the winding 13 interconnecting these valves. With the grid potentials of the several electric valves advanced by substantially 90 electrical degrees the apparatus draws only a wattless leading current from the circuit 10 operating in a manner similar to a synchronous condenser.

In the operation of the above described apparatus it will be noted that the potential across capacitors 34 and 35 reverses polarity each time that the load current is transferred between adjacent valves, that is six times for each complete cycle of the alternating current circuit 10. In other words, there appears across the terminals of capacitors 34 and 35 an alternating potential which has a frequency three times that of the circuit 10; that is, one which is a third harmonic. Triple frequency, alternating current energy may be derived from the apparatus by means of the secondary winding 37 of the transformer 36 and delivered to the alternating current load circuit 11. When energy is being drawn from the circuit 11, it will be apparent that the phase of the grid potentials of the several electric valves must be displaced substantially less than 90 electrical degrees in order to allow the passage of an energy component as well as a wattless component of current through the apparatus.

While I have described my invention as embodied in apparatus for transmitting energy from a three phase alternating current circuit to a single phase alternating current circuit of triple frequency, it will be apparent that it is equally suitable for transmitting energy between any polyphase alternating current circuit and an alternating current circuit having a frequency equal to half the number of phases of the supply circuit multiplied by the frequency of the supply circuit.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. An electric valve converting system comprising a polyphase alternating current supply circuit, a direct current circuit, a plurality of electric valves interconnecting said circuits to transmit current from said supply circuit to said direct current circuit, an impedance element in series circuit relationship with said current and provided with a pair of terminals each connected to alternate similarly disposed electric valves, and an alternating current load circuit energized with the potential across said impedance element.

2. An electric valve converting system comprising a polyphase alternating current supply circuit, a direct current circuit, a plurality of electric valves interconnecting said circuits to transmit current from said supply circuit to said direct current circuit, an energy storage element in series circuit relationship with said current and provided with a pair of terminals each connected to alternate similarly disposed electric valves whereby the potential thereacross is effective to commutate the current between adjacent valves, and an alternating current load circuit energized with the potential across said energy storage element.

3. In an electric translating system, the combination of an $n$-phase polyphase alternating current supply circuit, an alternating current load circuit adapted to operate at $n$ times the frequency of said supply circuit, and apparatus for transmitting energy therebtween comprising a direct current circuit, a plurality of electric valves interconnecting said direct and polyphase alternating current circuits, an impedance element in series circuit relationship with the current of the apparatus, and provided with a pair of terminals each connected to alternate similarly disposed electric valves, and means for energizing said load circuit with the potential across said impedance element.

4. An electric valve converting system comprising a polyphase alternating current supply circuit, a plurality of electric valves connected therewith for rectifier operation, an impedance element in series circuit relationship with the rectified current provided with a pair of terminals each connected to alternate similarly disposed electric valves, and an alternating current load circuit energized with the potential across said impedance element.

5. An electric valve converting system comprising a polyphase alternating current supply circuit, a direct current circuit, a plurality of electric valves interconnecting said circuits to transmit current from said supply circuit to said direct current circuit, a capacitor in series circuit relationship with said current, each of the terminals of said capacitor being connected to alternate similarly disposed electric valves, and an alternating current load circuit energized with the terminal potential across said capacitor.

6. An electric valve converting system comprising a polyphase alternating current supply circuit, a direct current circuit, a plurality of electric valves interconnecting said circuits to transmit current from said supply circuit to said direct current circuit, an inductive winding interposed in the connections between said valves and said direct current circuit, said winding being provided with an electrical midpoint connected to said direct current circuit and with end terminals, each connected to alternate corresponding valves, a capacitor connected across said winding, and an alternating current load circuit coupled with said inductive winding.

7. An electric valve converting system comprising a polyphase alternating current supply circuit, a direct current circuit, an impedance for short circuiting said direct current circuit, a plurality of electric valves interconnecting said circuits to transmit current from said supply circuit to said direct current circuit, an impedance element in series circuit relationship with said current and provided with a pair of terminals each connected to alternate similarly disposed electric valves, and an alternating current load circuit energized with the potential across said impedance element.

8. An electric valve converting system comprising a polyphase alternating current supply circuit, a direct current circuit, a reactance for short circuiting said direct current circuit, a plurality of electric valves interconnecting said circuits to transmit current from said alternating current circuit to said direct current circuit, each of said valves being provided with an anode, a cathode, and a control grid, means for impressing potentials on said control grids displaced in phase relative to their respective anode potentials to provide a wattless component of circulating current through the apparatus, an impedance element in series circuit relationship with the current through the apparatus and provided with a pair of terminals each connected to alternate similarly disposed electric valves, and an alternating current load circuit energized with the potential across said impedance element.

9. An electric valve converting system comprising a polyphase alternating current supply circuit, a direct current circuit, a polyphase inductive network, a plurality of electric valves connected between the several terminals of said network and said direct current circuit, each of said valves being provided with an anode, a cathode, and a control grid, an impedance for short circuiting said direct current circuit, an inductive winding provided with an electrical midpoint connected to one side of said direct current circuit and with a pair of end terminals, each connected to electric valves associated with alternate terminals of said network, a capacitor connected across said inductive winding, means for impressing upon said control grids potentials displaced in phase relative to their respective anode potentials to provide a wattless component of circulating current through the apparatus, and an alternating current load circuit coupled to said inductive winding and adapted to operate at a frequency which is a multiple of that of the supply circuit.

CLODIUS H. WILLIS.